United States Patent
Martin

(10) Patent No.: US 9,208,333 B2
(45) Date of Patent: Dec. 8, 2015

(54) SECURE DATA RECORDER

(75) Inventor: Thomas Martin, Sharjah (AE)

(73) Assignee: BRITISH TELECOMMUNICATIONS public limited company, London (GB)

( * ) Notice: Subject to any disclaimer, the term of this patent is extended or adjusted under 35 U.S.C. 154(b) by 347 days.

(21) Appl. No.: 13/638,417

(22) PCT Filed: Mar. 30, 2011

(86) PCT No.: PCT/GB2011/000490
§ 371 (c)(1),
(2), (4) Date: Sep. 28, 2012

(87) PCT Pub. No.: WO2011/121298
PCT Pub. Date: Oct. 6, 2011

(65) Prior Publication Data
US 2013/0019111 A1    Jan. 17, 2013

(30) Foreign Application Priority Data

Mar. 31, 2010 (GB) .................................. 1005500.2
Aug. 20, 2010 (GB) .................................. 1013982.2

(51) Int. Cl.
*G06F 21/62* (2013.01)
*G06F 21/78* (2013.01)
(Continued)

(52) U.S. Cl.
CPC ............... *G06F 21/62* (2013.01); *G06F 21/78* (2013.01); *H04L 9/0637* (2013.01); *H04L 9/0822* (2013.01); *H04L 9/0894* (2013.01); *G06F 2221/2107* (2013.01)

(58) Field of Classification Search
CPC ..... H04L 9/14; H04L 2209/04; H04L 9/0894; H04L 9/0637; H04L 9/0822; G06F 7/764; G06F 21/62; G06F 21/78; G06F 2221/2107
See application file for complete search history.

(56) References Cited

U.S. PATENT DOCUMENTS 6,085,323 A    7/2000 Shimizu et al.
7,356,146 B2 *  4/2008 Yi et al. ........................ 380/262

(Continued)

FOREIGN PATENT DOCUMENTS

GB    2 386 523    9/2003
WO    00/57595    9/2000

(Continued)

OTHER PUBLICATIONS

"A Guide to Understanding Data Remanence in Automated Information Systems", NCSC-TG-025, Version 2, Sep. 1991; 21 pages.

(Continued)

*Primary Examiner* — Matthew Smithers
(74) *Attorney, Agent, or Firm* — Nixon & Vanderhye P.C.

(57) ABSTRACT

A method and apparatus for securely encrypting data is disclosed. Conventional protections against the loss or theft of sensitive data such as full disk encryption are not effective if the device is, or has recently been, running when captured or found because the keys used for full disk encryption will still be in memory and can be used to decrypt the data stored on the disk. Some devices, such as devices which gather sensitive data in use, must run in environments in which they might be captured by a person seeking access to the sensitive data already recorded by the device. An encryption method is proposed in which files on a recorder's persistent memory are initialised with pseudo-random masking data whilst the recorder is in a relatively secure environment. One or more parameters which can be used to re-create the pseudo-random masking data are encrypted with a public key using a public-key encryption algorithm and stored on the recorder. The device's memory is then purged to remove the one or more parameters. Later, when miming in a relatively insecure environment, the sensitive data is encrypted (414) using a symmetric encryption algorithm, and combined (418) with the masking data previously stored in the storage file. When the encrypted files are transferred to a reader device with access to the corresponding private key, the masking data can be recreated, the symmetric encryption reversed and the sensitive data recovered. However, an adversary without the private key cannot recreate the masking data, and is thus unable to recover the sensitive data even with the symmetric encryption key which he might successfully extract from the recorder's volatile memory.

15 Claims, 5 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 7,471,791 B1 | 12/2008 | Coron et al. | |
| 7,471,792 B2 * | 12/2008 | Yamamichi et al. | 380/44 |
| 7,602,917 B2 * | 10/2009 | Vialen et al. | 380/270 |
| 7,734,049 B2 * | 6/2010 | Niemi et al. | 380/270 |
| 7,738,659 B2 * | 6/2010 | Moskowitz | 380/252 |
| 2002/0035682 A1 * | 3/2002 | Niemi et al. | 713/151 |
| 2004/0228360 A1 * | 11/2004 | Bae et al. | 370/432 |
| 2007/0121943 A1 | 5/2007 | Dellow et al. | |
| 2007/0150734 A1 * | 6/2007 | Gervais et al. | 713/170 |
| 2007/0186287 A1 | 8/2007 | Slade | |
| 2008/0028452 A1 | 1/2008 | Lee et al. | |
| 2008/0226074 A1 * | 9/2008 | Sammour et al. | 380/270 |
| 2008/0240435 A1 * | 10/2008 | Celik et al. | 380/255 |
| 2008/0285751 A1 * | 11/2008 | Peters | 380/210 |
| 2010/0241619 A1 * | 9/2010 | Snider et al. | 707/693 |
| 2010/0287386 A1 * | 11/2010 | Feix et al. | 713/193 |

FOREIGN PATENT DOCUMENTS

| | | | |
|---|---|---|---|
| WO | WO 01/72075 A1 * | 3/2001 | 713/193 |
| WO | 01/97524 | 12/2001 | |
| WO | 2007/006072 | 1/2007 | |

OTHER PUBLICATIONS

P. Blythe and J. Fridrich, "Secure Digital Camera", in Proceedings of Digital Forensic Research Workshop, 2004, 12 pages.

W. Knight, "MI5 laptop containing top secret data stolen", Mar. 24, 2000, 2 pages.

J. Salter, "Camera sold on eBay contained MI6 files", Sep. 30, 2008, 2 pages.

S. Coates, "Hazel Blears accused of breaching Official Secrets Act after laptop stolen"; Nov. 13, 2008, 3 pages.

A. Jones, G. Dardick, G. Davies, I. Sutherland, C. Valli, "The 2008 Analysis of Information Remaining on Disks Offered for Sale on the Second Hand Market" Journal of International Commercial Law and Technology, North America, Jul. 2009, 14 pages.

BBC "Hi-def DVD security is bypassed", Aug. 13, 2010, 2 pages.

J. A. Halderman, S. D. Schoen, N. Heninger, W. Clarkson, W. Paul, J. A. Calandrino, A. J. Feldman, J. Appelbaum, and E. W. Felten, "Lest We Remember: Cold Boot Attacks on Encryption Keys" Proc.17th USENIX Security Symposium (Sec '08), San Jose, CA, Jul. 2008, 16 pages.

R. Cramer, V. Shoup, "Design and Analysis of Practical Public-Key Encryption Schemes Secure against Adaptive Chosen Ciphertext Attack" SIAM Journal on Computing, vol. 33, 2001, 69 pages.

Maartmann-Moe, S. E. Thorkildsen, and A.Arnes, "The persistence of memory: Forensic identification and extraction of cryptographic keys" Digital Investigation, 6(1):S132-S140, 2009, 10 pages.

D. Gadher, "Black box to cut car insurance", The Sunday Times, Oct. 1, 2006, 1 page.

M. Dworkin, "Recommendation for Block Cipher Modes of Operation" NIST Special Publication 800-38A, 2001, 66 pages.

Chapter 6: Stream Ciphers ED—Menezes AJ; Van Oorschot PC; Vanstone SA, Oct. 1, 1996, Handbook of Applied Cryptography; CRC Press Series on Discrete Mathematics and its Applications, Boca Raton, FL, US pp. 191-222, 33 pages.

Ross Anderson, Roger Needham and Adi Shamir, "The Steganographic File System", Lecture Notes in Computer Science, vol. 1525, 1998, pp. 73-82, 10 pages.

* cited by examiner

Figure 1 (recorder)

Figure 2 (reader)

SECURE DATA RECORDER

This application is the U.S. national phase of International Application No. PCT/GB2011/000490, filed 30 Mar. 2011, which designated the U.S. and claims priority to GB Application No. 1005500.2, filed 31 Mar. 2010, and GB Application No. 1013982.2, filed 20 Aug. 2010, the entire contents of each of which are hereby incorporated by reference.

BACKGROUND AND SUMMARY

There have in recent years been a number of high-profile cases where a device storing sensitive data has been stolen or lost. In order to reduce the risk of information falling into the wrong hands by way of the loss or theft of a device, it is known to encrypt the contents of any persistent memory in the device (e.g. by using full disk encryption). However, such protection is only effective whilst the computer is switched off—if a computer is stolen or captured whilst it is switched on, then full disk encryption offers no protection against loss of data. Also, there is no protection against an attacker who has successfully installed malicious monitoring software on the computer.

Some data recorders record sensitive data in operation, and hence the so-called 'data at rest' protections mentioned above are of no use for protecting the sensitive information from an attacker who captures the data recorder in operation, or who has successfully installed malicious monitoring software on the data recorder. Similar considerations apply to laptop computers and the like which are intended to be used by people whilst travelling between relatively secure environments.

WO 2007/006072 describes a method of encrypting data for sending over an internal communications link within a personal computer. There is no discussion of how the personal computer might be used to securely store data in non-volatile storage (i.e. persistent storage which retains data even when the power supply is removed).

WO 01/72075 describes an improved implementation of a stream cipher in which an encryption key is used in the generation of a cryptographic mask. Again, there is no discussion of securely storing data in non-volatile storage.

According to a first aspect of the present invention, there is provided a data recorder comprising:
a receiver for receiving input data;
one or more persistent data stores storing pseudo-random masking data deterministically generated by a psuedo-random data generator in dependence on one or more masking data generation parameters;
one or more processors arranged in operation to combine said input data with said pseudo-random masking data to generate masked data using a masking process reversible with knowledge of said one or more masking data generation parameters;
a persistent data store updater arranged in operation to erase said pseudo-random masking data in said one or more persistent data stores once it has been used in said masking process, and to write the masked data output by said one or more processors in said one or more persistent data stores; and
an output for outputting said masked data from said one or more persistent data stores to a reader device having access to said one or more masking data generation parameters.

By operating a data recorder to generate masked data by combining record data with pseudo-random masking data previously stored in persistent memory, said pseudo-random masking data having been deterministically generated by a psuedo-random data generator in dependence on one or more masking data generation parameters, and erasing the pseudo-random masking data stored in said memory once it has been used in generating said masked data, said data recorder stores record data in a masked form which can only be decrypted by a reader able to generate identical pseudo-random masking data using said one or more masking data generation parameters. In this way, sensitive record data may be recorded in the persistent memory of the data recorder in a manner which makes that sensitive data inaccessible to someone who captures the data recorder in use, but accessible to someone in possession of the one or more masking data generation parameters. Importantly, there is no need for the processor to have the masking data generation parameters in volatile memory whilst generating the masked data from the (sensitive) record data. This overcomes or alleviates the problem of protecting data being recorded by the data recorder even from an attacker who has access to the data recorder whilst it is recording. This applies whether the attacker has physical access to the data recorder or virtual access by virtue of a snooping program or device maliciously installed in the data recorder.

It is to be noted here that persistent is used in the sense that the contents of the memory remain readable even after the data recorder has been powered down for sufficient time to allow the contents of the recorder's volatile memory to be lost.

Preferably, said persistent data updater overwrites said pseudo-random masking data in said persistent memory with the masked data output by said one or more processors. This has the advantage of efficiently combining the erasure of the masking data and the writing of the masked data.

Preferably, for example when in an initial relatively secure environment, said data recorder uses a mask parameter encryption key in encrypting said mask generation parameters, stores said encrypted mask generation parameters in said persistent memory, and deletes said mask parameter encryption key from said data recorder prior to combining input data with the pseudo-random mask data generated using said mask generation parameters.

This has the advantage that a reader need not store a plurality of mask generation parameters used to generate respective sets of mask data, but instead stores a mask generation parameter encryption key. This obviates the need for the reader to store data associating a plurality of mask generation parameters with respective sets of mask data and makes it easier for a single reader to be used to read data securely recorded by a plurality of data recorders.

In some embodiments, the deletion of the mask generation parameters prior to the use of mask data generated using those parameters, might be achieved by powering said data recorder down for some time prior to switching the data recorder back on in order to securely record input data. In other embodiments, the data recorder further comprises a pseudo-random mask data generator operable to generate a plurality of sets of pseudo-random mask data in said persistent memory, each set of pseudo-random data depending upon a different set of one or more mask generation parameters, said data recorder being arranged to delete the set of one or more parameters used in generating each file prior to combining input data with said set of pseudo-random data.

Preferably, the encryption of the one or more mask generation parameters uses a public-key encryption algorithm to encrypt the one or more parameters with a public key corresponding to a private key accessible to the reader.

Where the reader can be kept in a physically secure environment, then reader preferably stores the private key in its persistent memory.

According to some embodiments, there is provided a data recorder comprising:
means for receiving input data;
means for storing pseudo-random masking data deterministically generated by a psuedo-random data generator in dependence on one or more masking data generation parameters;
means for combining said input data with said pseudo-random masking data to generate masked data using a masking process reversible with knowledge of said one or more masking data generation parameters;
means for erasing said pseudo-random masking data once it has been used in generating said masked data;
means for recording the masked data output by said one or more processors; and
means for outputting said masked data to a reader having access to said one or more masking data generation parameters.

According to some embodiments there is provided a personal computer comprising:
a receiver for receiving input data;
one or more writable persistent data stores storing pseudo-random mask data deterministically generated by a pseudo-random data generator in dependence on one or more mask generation parameters;
one or more processors operable to combine said data for recording with said pseudo-random mask data, said combination being reversible by a reader able to generate identical pseudo-random mask data using said one or more mask generation parameters to recover said record data;
a memory writer operable to overwrite said pseudo-random mask data in said one or more persistent data stores with the combination data output by said one or more processors;
an output for outputting said combined data from said one or more persistent data stores to a reader having access to said one or more mask data generation parameters.

According to some embodiments, there is provided a reader for use with a data recorder according to the first aspect of the present invention, said reader comprising:
a receiver for receiving said masked data from said data recorder or said personal computer;
one or more processors operable to recreate said masking data using said one or more masking data generation parameters and to recover said input data by combining said masking data with said masked data;
one or more stores for storing said recovered input data.

Such a reader might be implemented as suitably programmed general purpose computer.

BRIEF DESCRIPTION OF THE DRAWINGS

There now follows, by way of example only, a description of some embodiments of the present invention. This description is given with reference to the accompanying drawings in which.

DETAILED DESCRIPTION OF PRESENT EXAMPLE EMBODIMENTS

Figure 1:
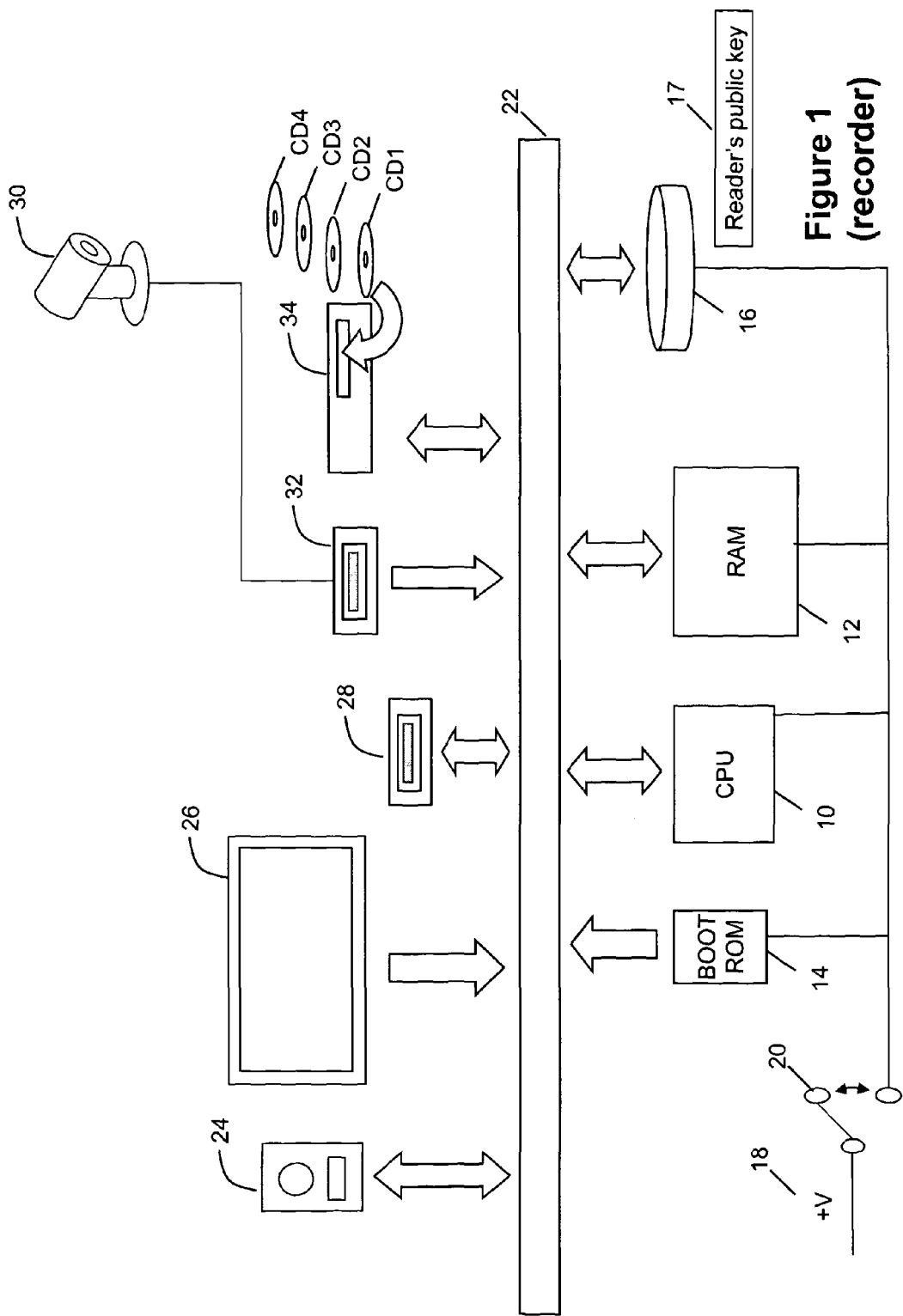
FIG. 1 shows a secure video event data recorder for installation in a commercial vehicle.

A secure video event data recorder (FIG. 1) for installation in a commercial vehicle comprises a computer system having a central processing unit 10, a volatile memory 12, a read-only memory (ROM) 14 containing a boot loader program and writable persistent memory—in this case in the form of a hard disk 16. The processor is able to communicate with each of these memories via a communications bus 22.

Also communicatively coupled to the central processing unit via the communications bus 22 are an command input device 24, a screen 26 for viewing by the user of the event data recorder, a USB socket 28 through which data recorded on the hard disk 16 can be uploaded to another device, another USB socket 32 to receive digital video data from a digital video camera 30 positioned to record the view from the front of the vehicle, and a CD-ROM drive 34.

All of the memories and input/output peripherals (10-16; 24-34) are powered by a electrical power supply 18 taken from the vehicle's battery. The power supply 18 to the video event data recorder can be switched off or on by means of the power switch 20. Those skilled in the art will realise that the volatile memory (RAM) 12 will lose any data it records a few minutes after the power supply 18 is switched off to deprive the RAM 12 of power. In contrast, the hard disk 16 (an example of a persistent memory) will keep any data it records for years without requiring any power supply to maintain the data recorded upon it.

An operating system program is installed on the video data recorder (and therefore stored on its hard disk 16) from CD-ROM CD1. As will be familiar to those skilled in the art, this provides a file system which application programs can use to persistently store data in files on persistent memories such as hard disk 16. Also installed on the video data recorder are: an initialisation program (stored on, and then loaded from, CD-ROM CD2) executable to pre-populate files stored on the hard disk 16 with mask data to support subsequent secure encryption of digital video data from the digital video camera 30; a secure recording program (stored on, and then loaded from, CD-ROM CD3) executable to securely record digital video data from the digital video camera 30 in files initialised using the initialisation program, and an secure data uploader program (stored on, and then loaded from, CD-ROM CD4) for transferring one or more files of securely recorded digital video data to an external device via the USB port 28.

Also provided on CD-ROM CD2 is a file containing library routines enabling symmetric encryption/decryption in accordance with the Data Encryption Standard (DES), public key encryption in accordance with the RSA algorithm, and various other cryptographic functions (in particular the library routines with header files openssl/des.h; openssl/rsa.h and openssl/engine.h available from the OpenSSL project might be provided). Yet further provided on CD-ROM CD2 is a public encryption key which the initialisation program copies to a public-key file 17 the hard disk 16 of the event data recorder. Other methods of loading such a key in the event data recorder's hard disk are possible—for example, the user might enter the public key as an alphanumeric string using the command input device 24 in combination with the display 26.

The purpose of the video data recorder (FIG. 1) is to store digital video data captured by the digital video camera 30 in such a way that even a person who has possession of the video data recorder is not able to view digital video data which has already been recorded in the device. In the specific example being given here, that might be desirable in order to allay the privacy concerns of members of the public, and/or to discourage commercial vehicle drivers from driving the vehicle recklessly or dangerously in order gather exciting video footage which they can then show to others. It will be realised that designing the video data recorder so that even a person who has possession of the video data recorder cannot review video data already gathered by the video camera will also be of use in scenarios where the vehicle is being used for covert surveillance, and the vehicle user desires to keep the data gathered during that surveillance from someone who captures the vehicle whilst it is carrying out surveillance.

However, it is required that a legitimate person wishing to view the data captured by the data recorder is subsequently able to view the data. In the commercial vehicle example, such a legitimate person might be a police officer or judge who wishes to view the data captured by the video event data recorder shortly before and during a road traffic accident involving the commercial vehicle.

Figure 2:
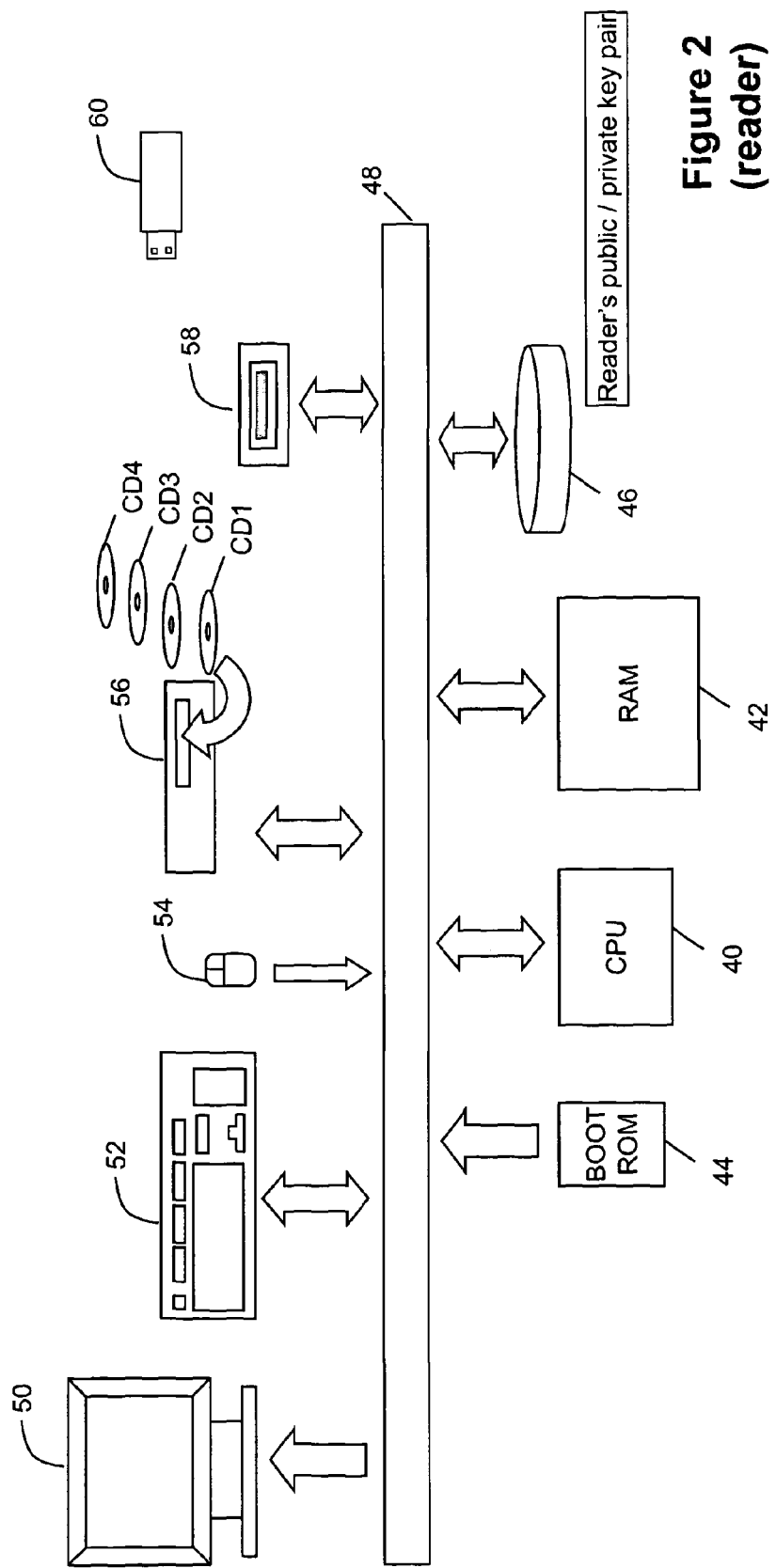
FIG. 2 shows a general purpose computer programmed and configured to read the data securely recorded by the video event data recorder.

This capability is provided using a reader device. In the present embodiment, the reader is a desktop computer (FIG. 2). The desktop computer is conventional in that it has a central processing unit 40, a random access memory (RAM) 42, a boot ROM 44 and a hard disk 46, all communicatively coupled to one another via a communications bus 48.

Also connected to the communications bus 48 are a display screen 50, a keyboard 52, a mouse 54, a USB socket 58 and a CD-ROM drive 56.

The desktop computer (FIG. 2) has software installed on it including an operating system program (stored on, and then loaded from, CD-ROM CD1) which, as will be understood by those skilled in the art, provides a file system on persistent memories such as hard disk 46 and USB flash drive 60. Also installed on the desktop computer is a secure file download application (stored on, and then loaded from, CD-ROM CD2), and a secure file decryption application (stored on, and then loaded from, CD-ROM CD3). To support these applications, library routines enabling symmetric encryption/decryption in accordance with the Data Encryption Standard (DES), public key encryption/decryption in accordance with the RSA algorithm, and various other cryptographic functions (in particular the library routines with header files openssl/des.h; openssl/rsa.h and openssl/engine.h available from the OpenSSL project) are stored on, and loaded from, CD-ROM CD4.

In the present example, the files of encrypted video data stored on the hard disk 18 of the recorder (FIG. 1) can be uploaded to the desktop computer (FIG. 2) by bringing the data recorder to the same location as the desktop computer and then connecting the two devices by connecting a USB cable between the USB port 28 on the data recorder to the USB port 58 on the desktop computer.

However, in other embodiments (especially where the data recorder is affixed within the vehicle or is otherwise not portable), it might be preferable to upload one or more encrypted files stored on the data recorder's hard disk 16 a portable removable storage device such as USB flash drive 60, and then transfer the USB flash drive 60 to the desktop computer, plug it into USB socket 28 and then run the secure file upload program on the desktop computer to move or copy the secure file from he USB flash drive 60 to the desktop computer's hard disk 46. In such an embodiment, in contrast to the arrangement described below in which the file set-up routine is run on the data recorder, the file set-up routine could be run on the desktop computer and used to set-up one or more files on the portable removable storage device (e.g. a USB flash drive), with that portable removable storage device subsequently being inserted in the USB port 28 of the data recorder. Since the operating system program running on the data recorder (FIG. 1) would also provide a file system on the USB flash drive, the one or more files pre-populated with mask data already on the USB flash drive could then be overwritten by the input data encryption program described below. Once such overwriting has occurred, the USB flash drive could subsequently be taken from the recorder and inserted in the reader (the desktop computer in this particular example) for decryption.

Indeed in some embodiments, the hard disk 16 of the data recorder could be dispensed with, with its persistent memory function instead be provided by the USB flash drive 60 inserted in the USB socket 28. This would be advantageous since memory in a USB flash drive 60 is often more reliably overwritten than is the case in a magnetic persistent memory device such as hard disk 16. Magnetic tape could be used in place of a USB flash drive 60.

Figure 3:
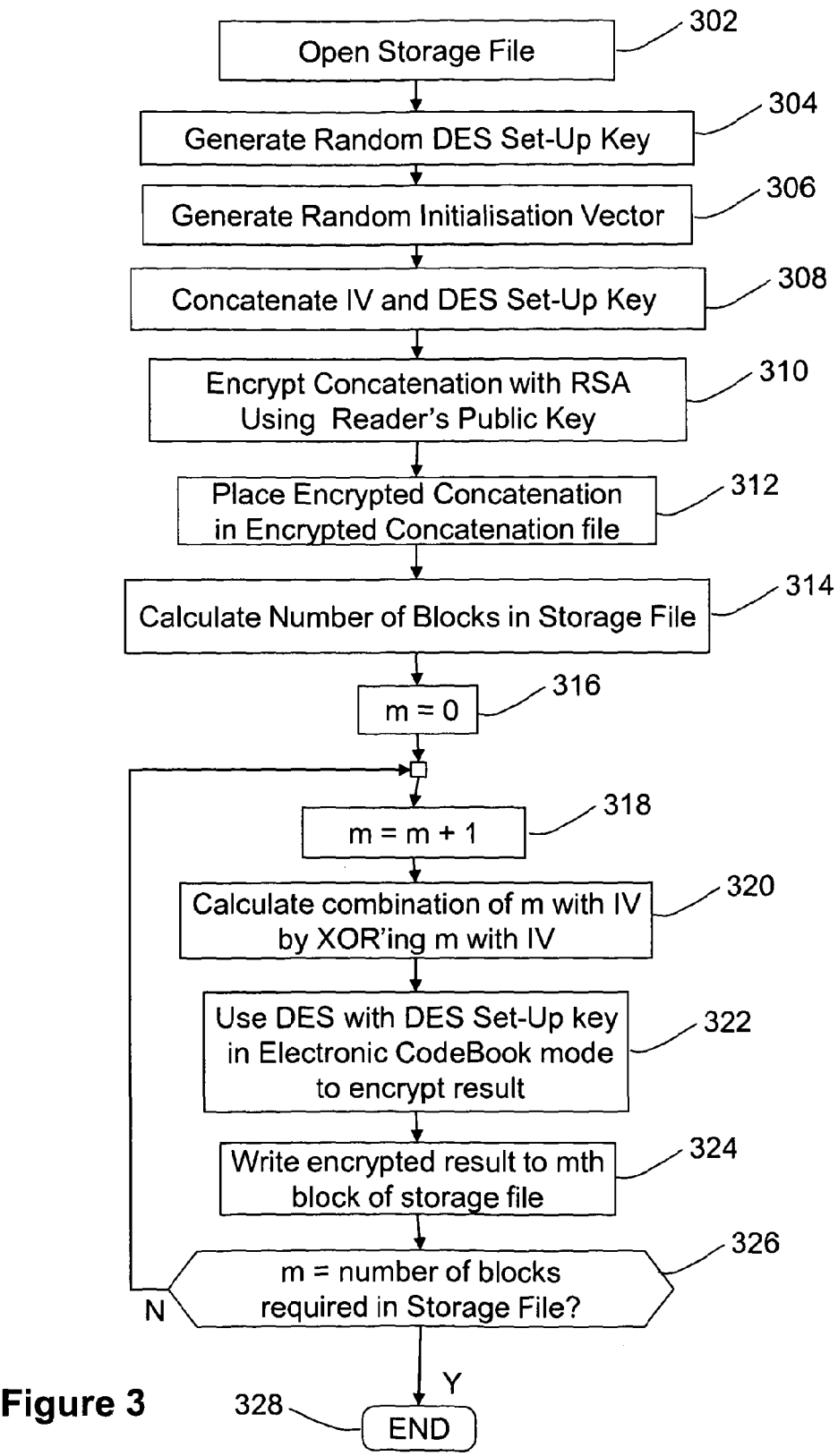
FIG. 3 shows a file initialisation program operated by the video event data recorder to initialise a file for subsequent secure recording.

As mentioned above, in this example, a file set-up program is installed on the data recorder (FIG. 1). The operation of the data recorder under control of the file set-up program will now be described with reference to FIG. 3.

The program begins with the opening of a storage file on the hard disk 16. Thereafter the data recorder generates 304 a 56-bit DES key (hereinafter the DES set-up key) and further generates 306 an initialisation vector, concatenates 308 the initialisation vector with the DES set-up key, uses the RSA public-key encryption code provided in the openssl library to encrypt 310 the concatenation with the public key stored in the public-key file 17. The data recorder then stores the public-key encryption of the concatenation in an encrypted concatenation file on the hard disk 16 of the data recorder.

Thereafter, the user's preferred size of storage file is retrieved (e.g. from the data recorder's user interface), and the number of 64-bit blocks in the storage file calculated 314. Having done that, a counter is initialised 316 to zero, and a loop of storage file pre-population instructions (318-324) is entered.

That loop of instructions (318-324) is repeated as many times as the number of 64-bit blocks calculated in step 314. Each iteration of that loop of instructions involves incrementing 318 the counter; combining 320 the value of the counter with the initialisation vector by performing an XOR (exclusive OR) of the binary representation of the value of the counter and the value of the initialisation vector; encrypting 322 the result of that XOR operation using DES with the DES set-up key; and storing 324 the resulting encryption in the mth block of the storage file. It will be realised that the repeated iteration of the loop of instructions (318-326) will result in the m blocks of the storage file on the hard disk 16 of the data recorder (FIG. 1) being initialised with pseudo-random data.

In preferred embodiment, having created masking data using the storage file initialisation program (FIG. 2), the data recorder is powered down by switching it off using the power switch 20. The data recorder is kept switched off for as long as is necessary for information stored in the RAM 12 to be lost. In particular, during the operation of the storage file initialisation program, the DES set-up key and the initialisation vector will have been present in RAM, and possibly various caches on the CPU 10. If an operating system program which provides so-called virtual memory is used (in preferred embodiments, the operating system program does not provide virtual memory or other means of transparently copying program variables to persistent memory), then a program such as Prevent Restore from PrivacyRoot is used to overwrite free space on the hard disk 16 in order to erase pages written to the disk by the operating system when providing virtual memory for the storage file initialisation program.

Figure 4:
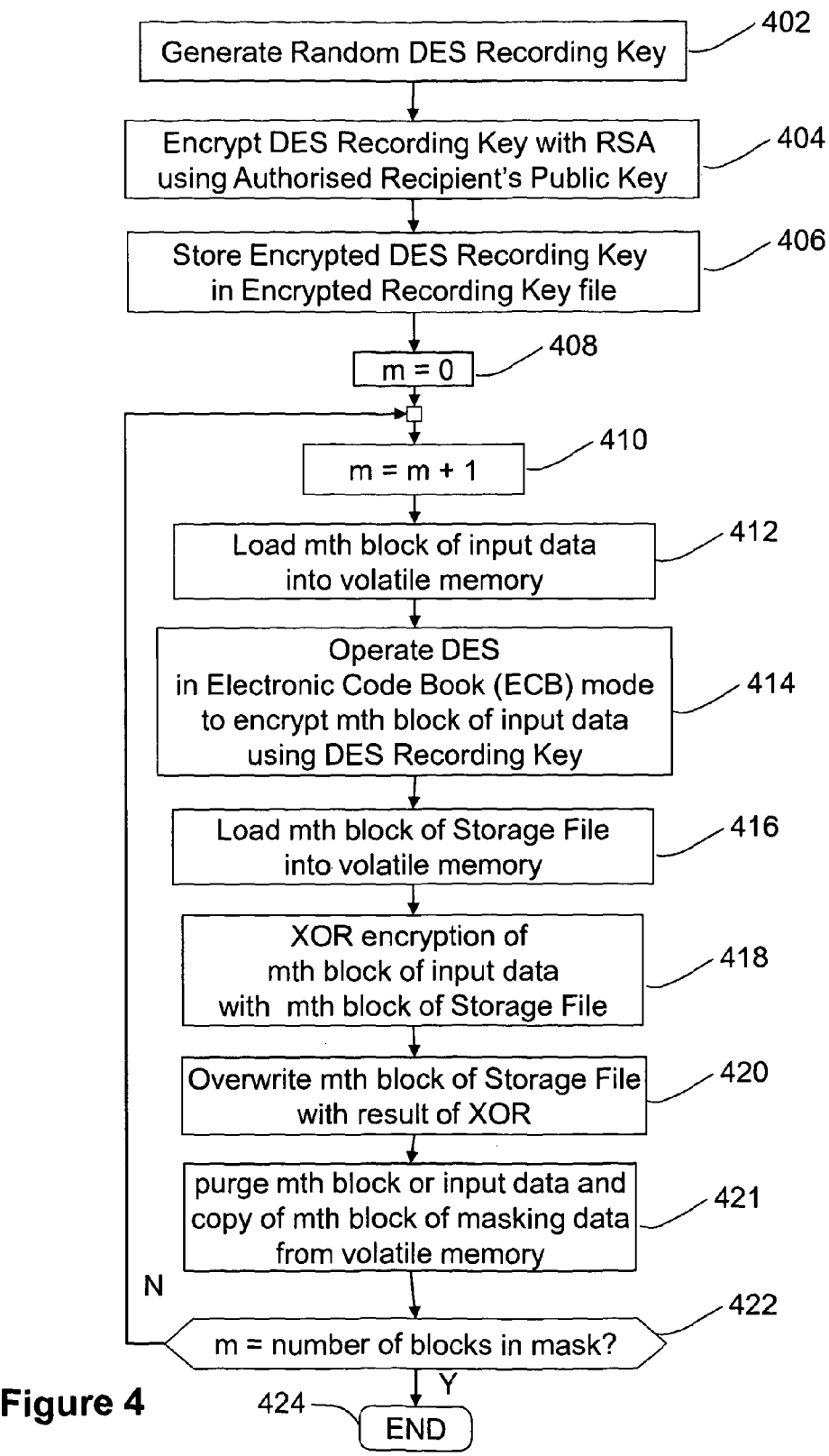
FIG. 4 shows an input data secure recording program operated by the video event data recorder to securely record video data input from the video camera in a secure file.

Once the data recorder has been powered down for a suitable length of time, the power is switched back on using the power switch 20, and the secure recording program is run. The operation of the secure recording program on the data recorder will now be explained with reference to FIG. 4.

Initially, the program generates 402 a 56-bit DES recording key and then encrypts 404 the recording key using RSA and the public key 17 stored on the data recorder's hard disk. The encrypted DES recording key is then stored 406 in an Encrypted Recording Key file on the data recorder's hard disk.

A counter is then initialised 408 to zero, and a loop of data block secure recording instructions (410-422) is repeated for each 64-bit block of video data which arrives from the data recorder's digital video camera 30. These instructions being with incrementing 410 the counter. Thereafter, the mth block of video data (m being the value of the counter) is loaded 412 into volatile memory 12, and that block of data is encrypted 414 using DES in electronic code book mode—using the DES recording key generated in step 402 which must itself at this time be stored in volatile memory 12 (otherwise the CPU 10 would be unable to carry out the encryption). The mth block from the storage file previously populated with masking data is then read 416 into RAM and a combination function is used to combine 418 the mth block of video data with the encryption of the mth block of masking data. In this particular example, the combination function is a bitwise exclusive OR (XOR) of the binary masking data and the binary video data. The mth block of the storage file on the hard disk 16 of the data recorder is then overwritten with the result of the combination, and the video data and masking data used in the current iteration of the loop of instructions (410 to 422) are purged 421 from volatile memory 12.

The loop of instructions is repeated until the masking data in the storage file has all been overwritten.

It is to be noted that where a hard disk is used for storage, overwriting the masking data might involve overwriting the masking data with one or more data patterns, and then overwriting the last of those data patterns with the result of the XOR carried out in step 418. Suitable techniques are described in A Guide to Understanding Data Remanence in Automated Information Systems NCSC-TG-025 issued by The National Computer Security Center in the United States.

As described above, once one or more storage files have been filled with encrypted input data by the data recorder, those encrypted files can be uploaded to a desktop computer running a secure file decryption application in order to recover the video data captured by the video camera 30 on the data recorder (FIG. 2).

Figure 5:
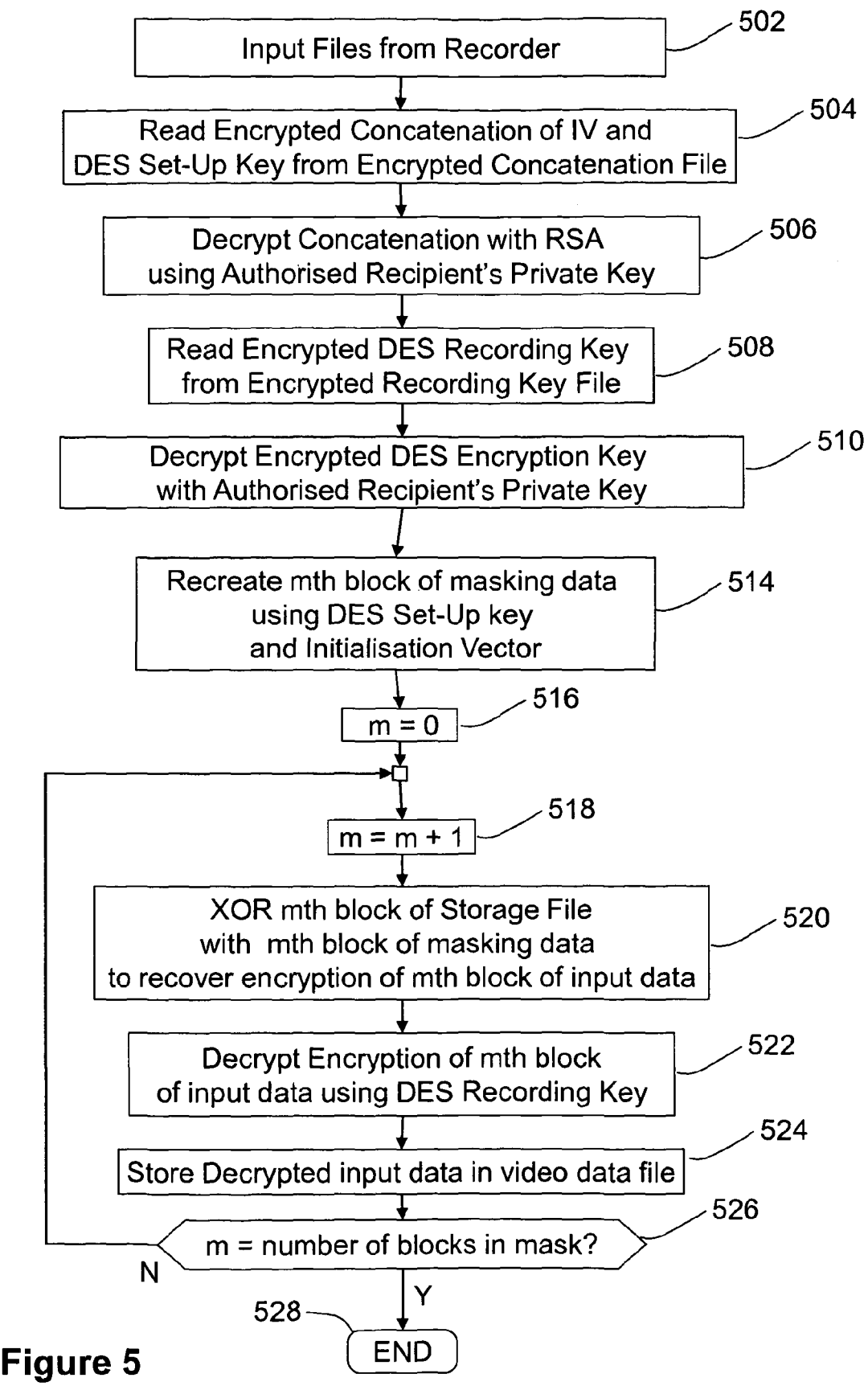
FIG. 5 shows a reader program operated by the general purpose computer to read a secure file transferred from a video event data recorder.

The operation of the secure file decryption application will now be described with reference to FIG. 5. First the storage file from the data recorder, and the corresponding encrypted concatenation file and encrypted recording key file are uploaded 502 to the hard disk 46 of the desktop computer (FIG. 2).

The encrypted concatenation is then read 504 and decrypted 506 using the private key stored on the hard disk 46 of the desktop computer. Similarly, the encryption of the DES recording key is then read 508 and decrypted 510 using the private key stored on the hard disk 46 of the desktop computer.

A set of masking data instructions similar to those described above in relation to the original creation of the masking data (FIG. 3: steps 316 to 326) is then carried out to recreate the masking data which was overwritten in the storage file. This is done using the concatenation of the DES Set-up key and initialisation vector recovered in step 506.

A counter is then initialised 514 to zero. A loop of instructions (516-526) is then carried out for each block of data in the storage file to recover the corresponding block of video data and store it in a video data file on the hard disk 46. The loop of instructions (516-526) is repeated as many times as is necessary to decrypt all the blocks of the storage file. It will be realised that this process will create a file of video data which can subsequently be viewed using a suitable viewer program on the display 50 of the desktop computer.

The loop of instructions (516-526) begins by incrementing 518 the counter. The mth block of the storage file is then combined with the mth block of masking data (stored following step 514) to recover the encrypted input data as generated in step 414. It is a useful property of the XOR function that XOR'ing given binary data with the same mask two times will result in the given binary data. The encrypted input data is then decrypted 522 using the DES Recording Key recovered in step 508. This recovers the mth block of input data which can then be added to a video data file containing the video data gathered by the digital video camera 30. It will be realised that the video data file may have a large size (e.g. more than a Gigabyte).

It will be seen how the above embodiment records the input data in such a way that an attacker who captures the data recorder in use is unable to read the input data recorded up until that point despite (as is often the case) having access to the key (DES recording key) being used for encryption and thus being present in the data recorder's RAM 12. This is because the parameters used for generating the masking data (DES set-up key and the initialisation vector) are stored in the data recorder in encrypted form on the data recorder's hard disk, whilst the key required to decrypt those parameters is (and never was) present on the data recorder. In this way the strength of public-key encryption schemes is gained, as well as the performance benefits of using a symmetric encryption algorithm to encrypt the input data.

The use of Electronic Code Book (ECB) mode in the above example goes against a prejudice in the art for using Cipher Block Chaining (CBC) mode. The reason for this prejudice is that when using ECB mode a given block of plaintext always encrypts to the same ciphertext. This can leak information and lead to a dictionary attack, especially when a large amount of data is being recorded as in the above example. However, this problem is overcome in the above embodiment by XOR'ing the encrypted data with the masking data after carrying out symmetric encryption using an Electronic Code Book mode. In alternative embodiments, the problem could be overcome by XOR'ing the encrypted data with the masking data prior to carrying out symmetric encryption using an Electronic Code Book mode.

Several variations on the above described embodiment are possible. These include, but are not limited to:

i) in the above embodiment, the reader and recording device were separate machines. In other embodiments, a single computer can act as both master and recorder. However, in this case, the file set-up process must be carried out in a physically secure environment, and the Master private key, the DES Set-Up key and the Initialisation Vector must be purged from the computer prior to that computer being taken out of that secure environment. This can be achieved by storing the Master private key on a removable media (e.g. a smart card) which is never taken out of said secure environment, deleting all caches, and powering down the computer for long enough (e.g. for a few minutes) to ensure that any data stored in the computer's volatile memory is lost, prior to taking the computer out of the secure environment. When the computer is returned to the secure environment, the smart card can be re-inserted and the above-described decryption process can be run to recover the input data;

ii) in the above embodiment, hybrid encryption was used (i.e. the encryption of the data was done using a symmetric encryption algorithm using a key which was itself encrypted using a public key encryption algorithm (RSA)). This is advantageous for recording data which arrives at a high-rate—e.g. the video data in the above example. However, in other embodiments where the input data arrives at a slow rate (e.g. in a vehicle event data recorder where only parameters such as speed, brake pedal depression degree, accelerator pedal depression degree, engine rpm and location are recorded a few times a second), the data might be encrypted using only a public key encryption algorithm. However, for input data which arrives quickly—e.g. video data, the use of public key encryption places an undesirably great processing burden on the processor in the recorder, so the use of hybrid encryption as seen in the above embodiment is preferred;

iii) whilst in the above embodiment, RSA was used as a public key algorithm, other public key algorithms (e.g.ElGamal or McEliece) could be used instead;

iv) whilst in the above embodiment, DES was used as a symmetric encryption algorithm, other symmetric encryption algorithms could be used—the more recent AES encryption algorithm is preferred;

v) the key lengths used in the above examples can of course be increased or decreased as the various algorithms mentioned above allow;

vi) in the above example a block cipher (DES in Electronic Codebook mode) was used for both the generation of the masking data and for the encryption of the input data before combining it with the masking data. However, different ciphers could be used in each case—in particular, a stream cipher might be used for the generation of the masking data instead of a block cipher;

vii) in the above example, it was assumed that the CPU had a single processor. However, in some embodiments the CPU has a plurality of processor cores, and the use of Electronic Code Book mode in the initialisation and/or the secure data recording process could be processed in parallel by different cores working on different blocks simultaneously.

viii) whilst in the above embodiment, the initialisation, secure recording and decryption programs were implemented in software, they might instead be implemented in hardware. However, this would require much more specialisation than is found in full disk encryption drives.

ix) whilst the above embodiment described a video equipped vehicle event data recorder for use in a commercial vehicle, in other embodiments the vehicle might be a military vehicle. More generally, alternative embodiments might include any device which needs to store potentially sensitive data, but which does not need to process that data. Other embodiments thus include CCTV cameras with built-in storage device, sensors on scientific equipment, and electronic voting machines. Yet further embodiments include computers, routers, communications switches, televisions, personal video recorders etc which store usage logs indicating which web-sites or TV programmes a user has been viewing, or telephone numbers or other identifiers of people with whom a user has been in contact.

x) in the above embodiment, the hard disk was used as a recording medium, and the mask was written to one file on the hard disk whilst another pre-initialised file was overwritten to record input data, however in other embodiments, a pre-initialised file might be provided on removable storage media being provided by a third party—for example a USB flash drive;

xi) in a case such as x), the third party might also be the authorised recipient of the recorded data, and is thus able to encrypt using the reader's private key.

xii) in the above example, overwritten files were transferred from the data recorder to the reader via a USB cable. However, in other embodiments, each computer might be provided with a network connector enabling connection to the same network, and the files might be transferred over that network. The network in question might be the Internet.

xiii) two files could be in use simultaneously on the data recorder, with one of the files being written to by the initialisation program, and the other (already initialised) being written to by the input data cryptographic recording program. Because the DES Set-up key used to initialise the two disks would be randomly chosen for each file, and hence different for each file, an attacker who captured the recorder would not be able to decrypt the contents of the file into which the input data is being recorded by virtue of having access to the set-up key and initialisation vector being used to initialise the other file. Provided that any caches in the recorder were deleted, and the recorder were powered down for a few minutes between the initialisation of a file and recording onto that file to cause the contents of the recorder's volatile memory to be lost, no security vulnerability would be introduced, and a pre-initialised file would be immediately available for use each time the file onto which the encrypted input data was being recorded is filled.

xiv) in the above embodiment, a single file was used which initially contained the masking data, and which was overwritten in use by the masked data. However, in other embodiments the masked data might be written to a separate file and the data recorder being programmed to overwrite the masking data with other data as soon as, or shortly after, the masking data has been used in generating the masked data.

xv) files represent an abstraction presented by a computer running an operating system which includes a file system program. In other embodiments, such an abstraction might not be presented to the user.

In summary of the above disclosure, a method and apparatus for securely encrypting data is disclosed. Conventional protections against the loss or theft of sensitive data such as full disk encryption are not effective if the device is, or has recently been, running when captured or found because the keys used for full disk encryption will still be in memory and can be used to decrypt the data stored on the disk. Some devices, such as devices which gather sensitive data in use, must run in environments in which they might be captured by a person seeking access to the sensitive data already recorded by the device. An encryption method is proposed in which files on a recorder's persistent memory are initialised with pseudo-random masking data whilst the recorder is in a relatively secure environment. One or more parameters which can be used to re-create the pseudo-random masking data are encrypted with a public key using a public-key encryption algorithm and stored on the recorder. The device's memory is then purged to remove the one or more parameters. Later, when running in a relatively insecure environment, the sensitive data is encrypted (414) using a symmetric encryption algorithm, and combined (418) with the masking data previously stored in the storage file. When the encrypted files are transferred to a reader device with access to the corresponding private key, the masking data can be recreated, the symmetric encryption reversed and the sensitive data recovered. However, an adversary without the private key cannot recreate the masking data, and is thus unable to recover the sensitive data even with the symmetric encryption key which he might successfully extract from the recorder's volatile memory.

What is claimed is:

1. A data recorder comprising:
   a data capture device for capturing input data;
   one or more persistent data stores storing pseudo-random masking data deterministically generated by a pseudo-random data generator in dependence on one or more masking data generation parameters;
   one or more processors arranged in operation to combine said input data with said pseudo-random masking data to generate masked data using a masking process reversible with knowledge of said one or more masking data generation parameters;
   a persistent data store updater arranged in operation to erase said pseudo-random masking data in said one or more persistent data stores once it has been used in said masking process, and to write the masked data output by said one or more processors in said one or more persistent data stores; and
   an output for outputting said masked data from said one or more persistent data stores to a reader device having access to said one or more masking data generation parameters.

2. A data recorder according to claim 1 in which said persistent data updater overwrites said pseudo-random masking data in said persistent memory with the masked data output by said one or more processors.

3. A data recorder according to claim 1 wherein said one or more processors are further operable to encrypt said one or more masking data generation parameters using a masking data generation parameter encryption key, store said encrypted masking data generation parameters in said one or more persistent data stores and delete said masking data generation parameter encryption key from said data recorder prior to combining said input data with the pseudo-random masking data.

4. A data recorder according to claim 3 wherein said one or more processors use a public-key encryption algorithm to generate an encryption of said one or more masking data generation parameters with a public key corresponding to a private key accessible only to said reader device, and said one or more persistent data stores further store said encryption of said one or more masking data generation parameters, said output being further operable to output said encryption of said one or more masking data generation parameters to said reader device.

5. A data recorder according to claim 3 further comprising a pseudo-random masking data generator operable to generate a plurality of sets of pseudo-random masking data in said one or more persistent data stores, each set of pseudo-random masking data depending upon a different set of one or more masking data generation parameters, said data recorder being arranged to delete the set of one or more masking data generation parameters used in generating each set of pseudo-random masking data prior to combining said input data with said set of pseudo-random masking data.

6. A data recorder according to claim 1 wherein said one or more processors generate said input data by encrypting captured data using a symmetric encryption algorithm using a symmetric encryption key.

7. A data recorder according to claim 6 wherein said one or more processors are further operable to encrypt said symmetric encryption key using a public key corresponding to a private key accessible only to the reader device, and said one or more persistent data stores further stores the encrypted symmetric encryption key.

8. A method of recording data in a device having a data capture device, one or more processors and one or more persistent data stores, said method comprising:
   capturing input data using said data capture device;
   storing pseudo-random masking data deterministically generated by a psuedo-random data generator in dependence on one or more masking data generation parameters;
   combining said input data with said pseudo-random masking data to generate masked data using a masking process reversible with knowledge of said one or more masking data generation parameters;
   erasing said pseudo-random masking data from said one or more persistent data stores once it has been used in generating said masked data;
   recording, in said one or more persistent data stores, the masked data output by said one or more processors; and
   outputting said masked data from said one or more persistent data stores to a reader having access to said one or more masking data generation parameters.

9. A method according to claim 8 further comprising:
   encrypting said one or more masking data generation parameters using a masking data generation parameter encryption key;
   storing said encrypted masking data generation parameters in said one or more persistent data stores; and
   deleting said masking data generation parameter encryption key from said data recorder prior to combining said input data with the pseudo-random masking data.

10. A method according to claim 9 further comprising:
    using a public-key encryption algorithm to generate an encryption of said one or more masking data generation parameters with a public key corresponding to a private key accessible only to said reader device;
    storing, in said one or more persistent data said encryption of said one or more masking data generation parameters; and
    outputting said encryption of said one or more masking data generation parameters to said reader device.

11. A method according to claim 9 further comprising:
    generating a plurality of sets of pseudo-random masking data in said one or more persistent data stores, each set of pseudo-random masking data depending upon a different set of one or more masking data generation parameters; and
    deleting the set of one or more masking data generation parameters used in generating each set of pseudo-random masking data prior to combining said input data with said set of pseudo-random masking data.

12. A non-transitory computer readable medium on which is encoded instructions executable by a computer having a data ca e device, to control said computer at least to:
    capture input data using said data capture device;
    store pseudo-random masking data deterministically generated by a psuedo-random data generator in dependence on one or more masking data generation parameters;

combine said input data with said pseudo-random masking data to generate masked data using a masking process reversible with knowledge of said one or more masking data generation parameters;

erase said pseudo-random masking data from said one or more persistent data stores once it has been used in generating said masked data;

record, in said one or more persistent data stores, the masked data output by said one or more processors; and outputting said masked data from said one or more persistent data stores to a reader having access to said one or more masking data generation parameters.

13. A non-transitory computer readable medium according to claim 12 wherein the encoded instructions executable by the computer control the computer at least further to:

encrypt said one or more masking data generation parameters using a masking data generation parameter encryption key;

store said encrypted masking data generation parameters in said one or more persistent data stores; and delete said masking data generation parameter encryption key from said data recorder prior to combining said input data with the pseudo-random masking data.

14. A non-transitory computer readable medium according to claim 13 wherein the encoded instructions executable by the computer control the computer at least further to:

use a public-key encryption algorithm to generate an encryption of said one or more masking data generation parameters with a public key corresponding to a private key accessible only to said reader device;

store, in said one or more persistent data store, said encryption of said one or more masking data generation parameters; and output said encryption of said one or more masking data generation parameters to said reader device.

15. A method according to claim 13 wherein the encoded instructions executable by the computer control the computer at least further to:

generate a plurality of sets of pseudo-random masking data in said one or more persistent data stores, each set of pseudo-random masking data depending upon a different set of one or more masking data generation parameters; and delete the set of one or more masking data generation parameters used in generating each set of pseudo-random masking data prior to combining said input data with said set of pseudo-random masking data.

* * * * *